(12) United States Patent
Retzlaff, III

(10) Patent No.: US 8,930,371 B1
(45) Date of Patent: Jan. 6, 2015

(54) SYSTEMS AND METHODS FOR EFFICIENTLY STORING INDEX DATA ON AN ELECTRONIC DEVICE

(75) Inventor: James R. Retzlaff, III, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 1380 days.

(21) Appl. No.: 12/164,913

(22) Filed: Jun. 30, 2008

(51) Int. Cl.
*G06F 17/30* (2006.01)

(52) U.S. Cl.
USPC .......................................... 707/741; 707/802

(58) Field of Classification Search
USPC .................................. 707/741, 802
See application file for complete search history.

(56) References Cited

U.S. PATENT DOCUMENTS

| | | | | |
|---|---|---|---|---|
| 6,292,795 B1 * | 9/2001 | Peters et al. | ........................... | 1/1 |
| 7,296,139 B1 * | 11/2007 | Case et al. | ................... | 711/209 |
| 7,349,942 B1 * | 3/2008 | O'Connell et al. | ........... | 709/203 |
| 2005/0144199 A2 * | 6/2005 | Hayden | ......................... | 707/204 |
| 2006/0294164 A1 * | 12/2006 | Armangau et al. | ........... | 707/205 |
| 2007/0016548 A1 * | 1/2007 | Iyer et al. | ........................... | 707/1 |
| 2008/0140652 A1 * | 6/2008 | Millman et al. | .................. | 707/6 |
| 2008/0243828 A1 * | 10/2008 | Reztlaff et al. | .................... | 707/5 |
| 2008/0281791 A1 * | 11/2008 | Ito et al. | ............................ | 707/3 |
| 2008/0293450 A1 * | 11/2008 | Ryan et al. | ................. | 455/556.2 |
| 2009/0177384 A1 * | 7/2009 | Walder | .......................... | 701/208 |

\* cited by examiner

*Primary Examiner* — Son T Hoang
(74) *Attorney, Agent, or Firm* — Lee & Hayes, PLLC

(57) ABSTRACT

A method for efficiently storing index data on an electronic device may include storing index data in data pages within an indexing data structure on the electronic device. The method may also include providing at least one directory for the indexing data structure. The method may also include dynamically modifying how many directory levels are provided for the indexing data structure in response to changes to the data pages within the indexing data structure.

17 Claims, 15 Drawing Sheets

SYSTEMS AND METHODS FOR EFFICIENTLY STORING INDEX DATA ON AN ELECTRONIC DEVICE

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. Benefits may be realized from improved systems and methods for interacting with an electronic device.

DETAILED DESCRIPTION

Figure 1:
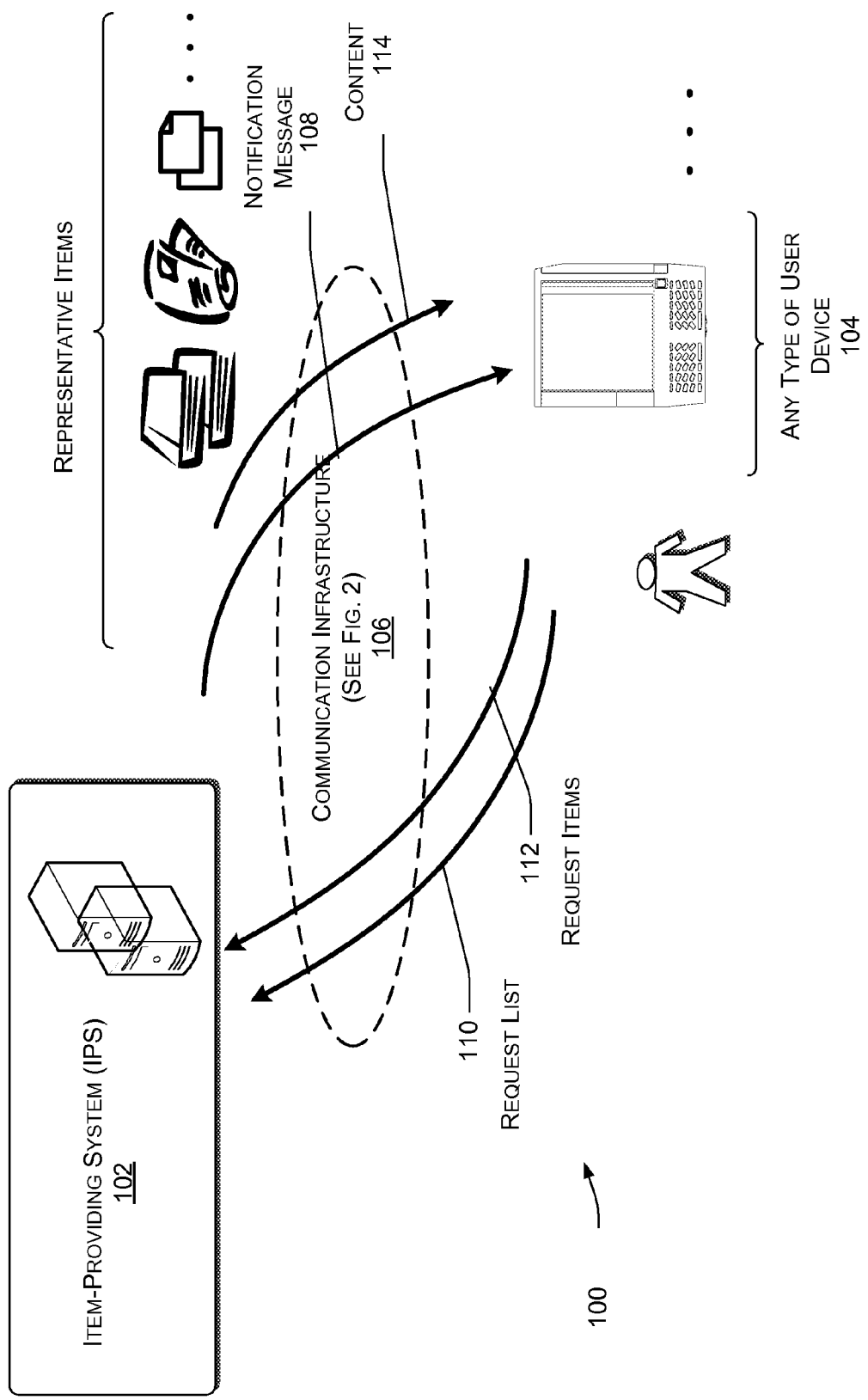
FIG. 1 is a block diagram illustrating a system for downloading items from an Item Providing System (IPS) to a user device.

A method for efficiently storing index data on an electronic device is disclosed. The method may include storing index data in data pages within an indexing data structure on the electronic device. The method may also include providing at least one directory for the indexing data structure. The method may also include dynamically modifying how many directory levels are provided for the indexing data structure in response to changes to the data pages within the indexing data structure.

Each directory may be stored in one or more directory pages within the data structure. The at least one directory may include information about memory locations where the data pages are stored. The at least one directory may include a higher-level directory and a lower-level directory. The higher-level directory may include information about memory locations where lower-level directory pages are stored.

Dynamically modifying how many directory levels are provided for the indexing data structure may include adding one or more directory levels to the indexing data structure. The one or more directory levels may be added to the indexing data structure when the number of data pages within the indexing data structure has increased such that a directory page corresponding to a lower-level directory is not sufficiently large to store the entire lower level directory.

Dynamically modifying how many directory levels are provided for the indexing data structure may include removing one or more directory levels from the indexing data structure. The one or more directory levels may be removed from the indexing data structure when the number of data pages within the indexing data structure has decreased such that a directory page corresponding to a lower-level directory is sufficiently large to store the entire lower level directory.

The electronic device may be an electronic book (e-book) reader. The index data may result from indexing e-books that are stored on the e-book reader.

An electronic device that is configured for efficiently storing index data is disclosed. The electronic device may include a processor. The electronic device may also include memory in electronic communication with the processor. The electronic device may also include instructions stored in the memory. The instructions may be executable to store index data in data pages within an indexing data structure on the electronic device. The instructions may also be executable to provide at least one directory for the indexing data structure. The instructions may also be executable to dynamically modify how many directory levels are provided for the indexing data structure in response to changes to the data pages within the indexing data structure.

A computer-readable medium for efficiently storing index data on an electronic device is disclosed. The computer-readable medium may include executable instructions for storing index data in data pages within an indexing data structure on the electronic device. The computer-readable medium may also include executable instructions for providing at least one directory for the indexing data structure. The computer-readable medium may further include executable instructions to dynamically modifying how many directory levels are provided for the indexing data structure in response to changes to the data pages within the indexing data structure.

According to one illustrative implementation, this disclosure sets forth functionality for downloading items to a user device. The functionality may be manifested in various systems, modules, computer readable media, data structures, methods, and other forms.

The "item" referenced above may correspond to any type of content. In one case, the item corresponds to a digital media item. The media item may include, without limitation, text content, image content, audio content, video content, hypertext protocol content, and so on, or any combination of these kinds of content. In addition, or alternatively, the item may include instruction-bearing content, such as machine readable program code, markup language content, script content, and so forth. For instance, an item may correspond to a software upgrade or the like.

More specifically, in one case, the term "item" may refer to a specific unit of merchandisable content, such as a book (e.g., an "eBook"), an issue of a magazine, and so on. Alternatively, an item may refer to smaller parts of a merchandisable unit, such as a chapter of a book or a song in an album. Alternatively, an item may refer to a larger compilation of component items which are related in any manner. For instance, an item may refer to multiple issues of a magazine in a particular year.

In general, the various features described in the implementations may be regarded as optional features, meaning that these features may be omitted or replaced with other features. Further, the various implementations described herein may be supplemented by adding additional features.

FIG. 1 is a block diagram illustrating a system 100 for downloading items from an Item Providing System (IPS) 102 to a user device 104. At the device 104, the user may consume the media items in electronic form, as opposed to traditional hard-copy form. Although not shown, the user device 104 represents one of a potentially great number of user devices.

As explained above, the term "item" has broad connotation. The following list, which is non-exhaustive, identifies representative types of items.

An item may correspond to an eBook item. An eBook item, in turn, may refer to a book in electronic form or to one or more portions of a book (such as a chapter of a book) or to a compilation of multiple books (such as a book series), and so on. An eBook is an example of a general class of items referred to herein as pre-generated items. The term pre-generated item refers to content typically (although not necessarily) provided to a user in response to the user's on-demand request for the content after it has been received and stored by the IPS 102.

An item of content may also correspond to a subscription-related item. A subscription-related item refers to any item the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of the item by the IPS 102, rather than the user's on-demand request for a pre-generated item.

An item may also correspond to a personal document item, or simply "personal item." A personal item refers to a document the user forwards in advance to the IPS 102, whereupon the IPS 102 converts the item to a device-readable format.

An item may also correspond to audio content, such as a piece of music, a collection of music, an audio book, and so on. An item may also correspond to a bundle of information generated in response to a query made by the user. An item may also correspond to instruction-bearing content, such as a software update. An item may also correspond to advertising material downloaded to the user device by any entity or combination of entities. Various rules may be applied to govern the downloading of this type of item.

An item may also correspond to a sample of a more complete version of the item. In one case, a sample-type item may embed one or more links to allow the user to acquire its full-version counterpart, or another part (e.g., chapter) of the item. In another case, a publisher or author may release an eBook or other item in a series of installments. Each installment may be regarded as an item.

The item-providing system (IPS) 102 corresponds to any functionality or combination of functionality for forwarding items to the user device 104. In one case, the IPS 102 may correspond to network-accessible server-based functionality, various data stores, and/or other data processing equipment. The IPS 102 may be implemented by a single collection of functionality provided at a single physical site. Alternatively, the IPS 102 may be implemented by multiple collections of functionality, optionally provided at plural physical sites. The IPS 102 may be administered by a single entity or plural entities.

In one case, the IPS 102 corresponds to an entity which provides items to users upon the users' purchase of the items. In this role, the IPS 102 may essentially act as a bookseller or the like. In one particular commercial environment, the IPS 102 may also offer services which allow users to purchase hard-copy books for physical delivery to the users; in this context, the IPS 102 may allow users to download electronic items to respective user devices as part of its entire suite of services. In other cases, the IPS 102 corresponds to an entity which provides items to users on a non-fee basis or on the basis of some other type of alternative compensation arrangement. Thus, the term "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning the user may freely carry the user device 104 from one location to another. In one particular case, the user device is designed as a book reader device, also known as an eBook reader device. In this case, the user device 104 functions as the electronic counterpart of a paper-based book. The user may hold the user device 104 in a manner similar to a physical book; the user may electronically turn the pages of the book, and so on.

Without limitation, FIG. 1 illustrates a particular type of eBook reader device. Additional details regarding this particular type of reader device are provided below. Alternatively, the user device 104 may correspond to any other type of portable device, such as a portable music player, a personal digital assistant (PDA), a mobile telephone, a game module, a laptop computer, and so on, and/or any combination of these types of devices. Alternatively, or in addition, the user device 104 may correspond to a device which is not readily portable, such as a personal computer, a set-top box associated with a television, a gaming console, and so on.

A communication infrastructure 106 bi-directionally couples the IPS 102 to the user device 104. Namely, the IPS 102 downloads items, upgrades, and/or other information to the user device 104 via the communication infrastructure 106. The IPS 102 receives various instructions and other data from the user device 104 via the communication infrastructure 106.

The communication infrastructure 106 may include any combination of communication functionality, including any combination of hardwired links and/or wireless links, etc. For instance, FIG. 2 (to be discussed below in turn) shows one implementation of the communication infrastructure 106 which includes a combination of a wide area network (WAN) and wireless infrastructure. By virtue of the wireless component of the communication infrastructure 106, the user may use the user device 104 to purchase items and consume items without being tethered to the IPS 102 via hardwired links. Thus, for instance, a user may purchase and consume an eBook using the device while riding in a car as a passenger, while hiking in a park, while boating on a lake, and so forth.

FIG. 1 shows four exchanges which describe, in very high-level form, part of a procedure for downloading items to the user. In a first message 108, the IPS 102 may send a notification message to the user device 104. The notification message 108 instructs the user device 104 to download one or more items from the IPS 102 and/or perform other actions. In a second message 110, the user device 104 requests the IPS 102 to supply a list which identifies one or more items to be downloaded (and/or other actions to be performed, such as, in one case, sending information back to the IPS 102).

The user device 104 receives the list from the IPS 102 in response to the second message 110 (note FIG. 1 does not specifically identify the transmission of the list from the IPS 102 to the user device 104). If the instructions identify items to be downloaded, in a third message 112, the user device 104 sends a request to the IPS 102, asking the IPS 102 to download the items identified in the list. In a fourth message 114, the IPS 102 downloads the requested items to the user device 104. In effect, the user device 104 retrieves the items using a pull approach, but the pull approach is initiated by a push operation (by virtue of the IPS 102 "pushing" a notification message 108 to the user device 104).

Figure 2:
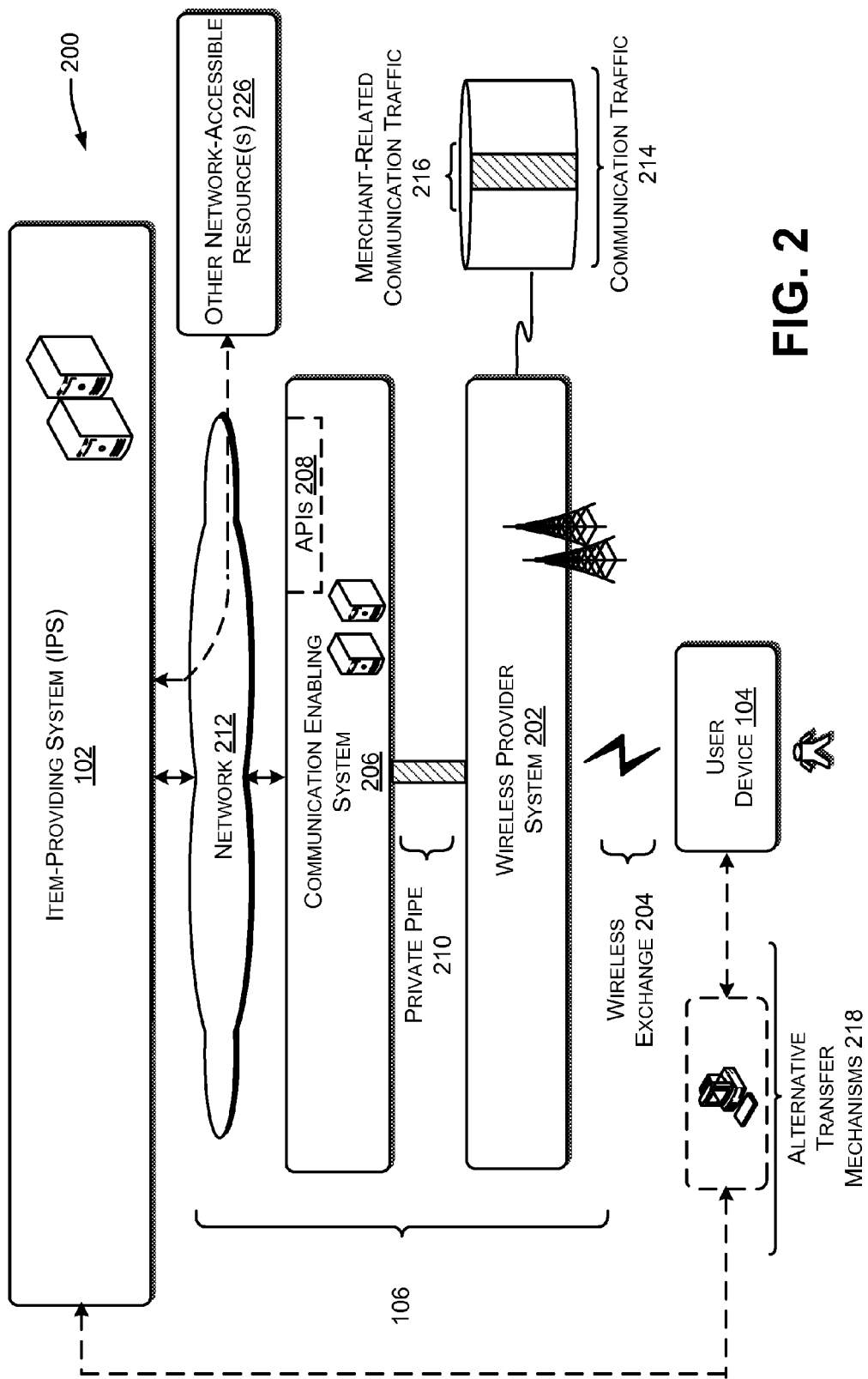
FIG. 2 shows a system which represents one illustrative implementation of the general system of FIG. 1.

FIG. 2 shows a system 200 which represents one illustrative implementation of the general system 100 of FIG. 1. By way of overview, the system 200 includes the components identified above, namely IPS 102 coupled to a user device 104 via communication infrastructure 106.

The communication infrastructure 106 may include multiple components. A first component may be a wireless provider system 202. The wireless provider system 202 corresponds to any infrastructure for providing a wireless exchange 204 with the user device 104. In one case, the wireless provider system 202 is implemented using various data processing equipment, communication towers, and so forth (not shown).

Alternatively, or in addition, the wireless provider system 202 may rely on satellite technology to exchange information with the user device 104. The wireless provider system 202 may use any form of electromagnetic energy to transfer signals, such as, without limitation, radio-wave signals. The wireless provider system 202 may use any communication technology to transfer signals, such as, without limitation, spread spectrum technology, implemented, for instance, using the Code Division Multiple Access (CDMA) protocol. The wireless provider system 202 may be administered by a single entity or by a cooperative combination of multiple entities.

The communication infrastructure 106 may also include a communication-enabling system 206. One purpose of the communication-enabling system 206 is to serve as an intermediary in passing information between the IPS 102 and the wireless provider system 202. The communication-enabling system 210 may be implemented in any manner, such as, without limitation, by one or more server-type computers, data stores, and/or other data processing equipment.

The communication-enabling system 206 may communicate with the wireless provider system 202 via a dedicated channel 210, also referred to as a dedicated communication pipe or private pipe. The channel 210 is dedicated in the sense it is exclusively used to transfer information between the communication-enabling system 206 and the wireless provider system 202. In contrast, the communication enabling system 206 communicates with the IPS 102 via a non-dedicated communication mechanism, such as a public Wide Area Network (WAN) 212. For example, the WAN 212 may represent the Internet.

The users may access the IPS 102 through alternative communication routes which bypass the wireless provider system 202. For instance, as indicated by alternative access path 218, a user may use a personal computer or the like to access the IPS 102 via the wide area network 212, circumventing the wireless provider system 202 and the communication-enabling system 206. The user may download items through this route in conventional fashion. The user may then transfer the items from the personal computer to the user device 104, e.g., via a Universal Serial Bus (USB) transfer mechanism, through the manual transfer of a portable memory device, and so on. This mode of transfer may be particularly appropriate for large files, such as audio books and the like. Transferring such a large amount of data in wireless fashion may have a relatively high cost. However, the system 200 may also be configured to transfer large files (such as audio files) via the wireless exchange 204.

Figure 3:
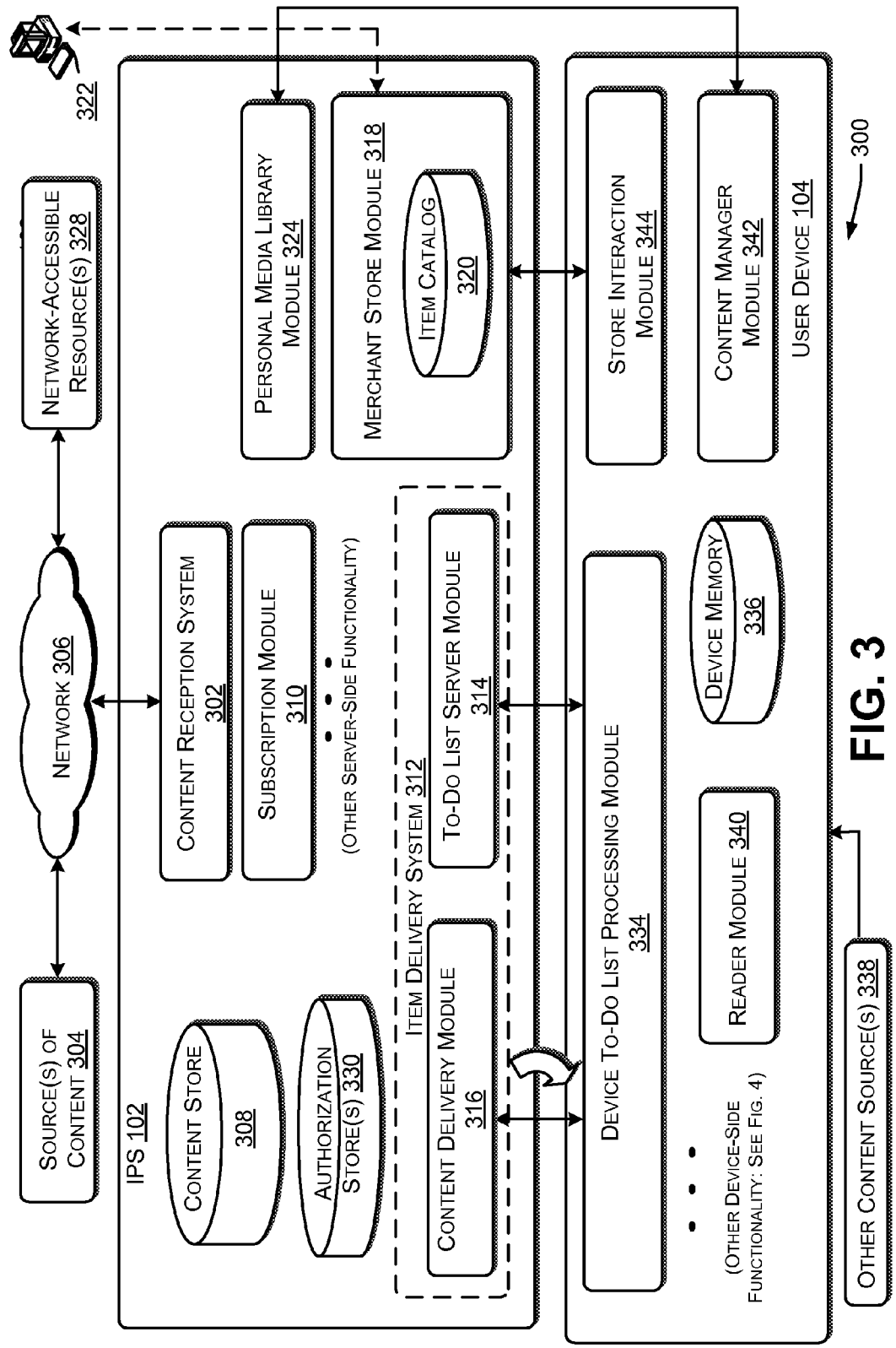
FIG. 3 shows a system including a more detailed depiction of the IPS and the user device.

FIG. 3 shows a system 300 including a more detailed depiction of the IPS 102 and the user device 104 (which were introduced in FIGS. 1 and 2). Although not shown, the system 300 shown in FIG. 3 may use the wireless features shown in FIG. 2.

In another implementation, the system 300 may use some other communication infrastructure than is shown in FIG. 2, which may optionally omit the use of wireless communication.

Addressing the details of the IPS 102 first, this system 102 performs various functions. Different modules are associated with these different functions. One module is a content reception system 302. The content reception system 302 receives content from one or more sources of content 304. The sources 304 may represent any type of provider of content, such as eBook publishers, newspaper publishers, other publishers of periodicals, various feed sources, music sources, and so on.

The sources 304 may be administered by a single entity or may be administered by separate respective entities. Further, the entity administering the IPS 102 may correspond to a same entity which administers one or more of the sources 304. Alternatively, or in addition, the entity administering the IPS 102 may interact with one or more different entities administering one or more respective sources 304. In the latter case, the entity administering the IPS 102 may enter into an agreement with the source entities to receive content from these source entities.

In the above example, the entities associated with the sources 304 may correspond to commercial organizations or other types of organizations. In another case, one or more of the sources may correspond to individual users, such as the creators of the items. For example, a user may directly provide items to the IPS 102. Alternatively, or in addition, a user may supply content to a community repository of items, and the IPS 102 may receive content from this repository, and so on.

The content reception system 302 may obtain the content through various mechanisms. In one case, the content reception system 302 obtains the content via one or more networks 306. The networks 306 may represent a WAN, such as the Internet, a Local Area Network (LAN), or some combination thereof. The content reception system 302 may receive the information in various forms using any protocol or combination of protocols. For instance, the content reception system 302 may receive the information by making a Hypertext Transfer Protocol (HTTP) request, by making a File Transfer Protocol (FTP) request, by receiving a feed (e.g., an RSS feed), and so forth.

In another case, the IPS 102 may obtain content via a peer-to-peer (P2P) network of sources 304. More generally, the content reception system 302 may proactively request the content in an on-demand manner (based on a pull method of information transfer). Or the content reception system 302 may receive the content in response to independent transfer operations initiated and performed by the sources 304 (based on a push method of information transfer). Alternatively, the content reception system 302 may use a combination of pull and push transfer mechanisms to receive the content.

The content reception system 302 may receive content in the form of items. Without limitation, the items may include eBooks, audio books, music, magazine issues, journal issues, newspaper editions, various feeds, and so forth. In one case, the content reception system 302 may receive some items expressed in a format not readable by the user device 104 (where the user device may optionally be configured to receive, process, and present content expressed in one or more predefined formats). To address this situation, the content reception system 302 may convert the items from their original format into a device-readable format (such as, without limitation, the .mobi format).

The content reception system 302 stores the items received (and optionally converts them to another format) in a content store 308. The content store 308 includes one or more storage systems for retaining items in electronic form, located at a single site or distributed over plural sites, administered by one or more entities.

The IPS 102 also includes a subscription module 310. The subscription module 310 manages users' subscriptions to subscription-related items. Generally, a subscription entitles a user to receive one or more subscription-related items (which are yet to be received and stored by the content reception system 302) based on any type of consideration or combination of considerations. Without limitation, subscription-related item types include magazines, journals, newsletters, newspapers, various feeds, and so forth. Users may arrange to receive subscription-related items by purchasing such subscriptions, or, more generally, by registering to receive such subscriptions (which, in some cases, may not involve the payment of a fee).

Alternatively, or in addition, the IPS 102 may automatically register users to receive subscription-related items without the involvement of the users (and possibly without the approval of the users). The latter scenario may be appropriate in the case in which the IPS 102 (or some other entity) registers a user to receive unsolicited advertisements, newsletters, and so on. The system 300 may allow the user to opt out of receiving such unsolicited information.

The IPS 102 may consult the subscription module 310 to determine which user devices should receive a newly-received subscription-related item. For instance, upon receiving an electronic issue of the magazine Forbes, the IPS 102 consults the subscription module 310 to determine the users who have paid to receive this magazine. The IPS 102 then sends the issue to the appropriate user devices.

An item delivery system 312 represents the functionality which actually performs the transfer of content to the user device 104. In one illustrative representation, the item-delivery system 312 includes two components: a to-do list server module 314 and a content delivery module 316. The to-do list server module 314 generally provides instructions for the user device 104. The instructions direct the user device 104 to retrieve items and perform other operations. The content delivery module 316 allows the user device 104 to obtain the items identified in the instructions received from the to-do list server module 314.

More specifically, in a first phase of information retrieval, the to-do list server module 314 sends a notification message to the user device 104. The user device 104 responds to the notification message by waking up (if "asleep"), which may involve switching from a first power state to a second power state (where the second power state consumes more power than the first power state).

The user device 104 may then contact the to-do list server module 314 to request instructions from the to-do list server module 314. More specifically, for each user device, the to-do list server module 314 maintains a list of entries, also referred to herein as a "to-do queue." An entry provides an instruction for a user device to perform an action. As will be described in greater detail below, there are different instructions that a device may be directed to perform, wherein a collection of instructions defines an IPS-device interaction protocol. One such action (e.g., associated with a GET instruction of the protocol) directs the user device 104 to retrieve an item from a specified location by specifying an appropriate network address (e.g., a URL) and appropriate arguments.

In a first phase of the downloading procedure, the user device 104 may retrieve n such entries, wherein n is an integer. In one scenario, the number n may be a subset of a total number of items in the to-do queue associated with the user device 104. In a second phase of the downloading procedure, the user device 104 may contact the content delivery module 316 to retrieve one or more items identified in the GET-related entries.

In general, after receiving the notification message, the item delivery system 312 may interact with the user device 104 in a data mode, e.g., using the Hypertext Transfer Protocol (HTTP), or some other protocol or combination of protocols.

The IPS 102 may also include a merchant store module 318. The merchant store module 318 may provide access to an item catalog 320, which, in turn, may provide information regarding a plurality of items (such as eBooks, audio books, subscription related items, and so on). As will be described in greater detail below, the merchant store module 318 may include functionality allowing a user to search and browse though the item catalog 320. The merchant store module 318 may also include functionality allowing a user to purchase items (or, more generally, acquire items based on any terms).

In one case, a user may interact with the merchant store module 318 via the user device 104 using wireless communication. Alternatively, or in addition, the user may interact with the merchant store module 318 via another type of device 322, such as a personal computer, optionally via wired links. In either case, when the user purchases or otherwise acquires an item via the merchant store module 318, the IPS 102 may invoke the item delivery system 312 to deliver the item to the user.

The IPS 102 may also include a personal media library module 324. The personal media library module 324 may store, for each user, a list of the user's prior purchases. More specifically, in one case, the personal media library module 324 may provide metadata information regarding eBook items and other on-demand selections (e.g., "a la carte" selections, such as subscription issues, etc.) which a user already owns. The personal media library module 324 may also provide links to the items in the content store 308. As will be described in greater detail below, to download an eBook item (or the like) which the user has already purchased, the user device 104 contacts the content delivery module 316.

The content delivery module 316 may interact with permission information and linking information in the personal media library module 324 in order to download the item to the user. In one use scenario, the user device 104 may access the content delivery module 316 in this manner to initiate downloading of an item which has been previously purchased by the user but has been deleted by the user device 104 for any reason.

The IPS 102 may also include various security-related features, such as one or more authorization stores 330. The authorization stores 330 may provide information which enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality," the IPS 102 may include additional functions, many of which are described below.

Now turning to the device-side features of the system 300, the user device 104 may include a device to-do list processing module 334. The purpose of the device to do list processing module 334 may be to interact with the item delivery system 312 to download items from the item delivery system 312. Namely, in a first phase of the downloading procedure, the device to-do list processing module 334 may first receive a notification message from the to-do list server module 314, which prompts it to wake up (if "asleep") and contact the to-do list server module 314 to retrieve a set of n entries.

Each entry may include an instruction which directs the device to-do list processing module 334 to perform an action. In a second phase, for a GET-type entry, the device to-do list processing module 334 may contact the content delivery module 316 to request and retrieve an item identified by the GET-type entry. As will be described in greater detail below, the user device 104 may signal a successful completion of the download process or a failure in the download process.

Upon downloading an item, the user device 104 may store the item in a device side memory 336, which in one example is a flash-type memory and may be any other type of memory in other examples. Although not shown, the user device 104 may also exchange information with any other source of content 338. In one illustrative case, the other source of content 338 may represent a personal computer or other data processing device. Such other source of content 338 may transfer an item to the user device 104 via a Universal Serial Bus (USB) connection and/or any other type(s) of connection(s). In this scenario, the other source of content 338, in turn, may receive the item from the IPS 102 (or other source) via hardwired connection (e.g., non-wireless connection). For example, to receive an audio book, the user may use a personal computer to non-wirelessly download the audio book from a network-accessible source of such content. The user may then transfer the audio book to the user device 104 via USB connection. In another illustrative case, the other source of content 338 may represent a portable memory module of any type, such as a flash type memory module, a magnetic memory module, an optical memory module, and so on.

The user device 104 may also include a reader module 340. The illustrative purpose of the reader module 340 is to present media items for consumption by the user using the user device 104. For example, the reader module 340 may be used to display an eBook to the user to provide a user experience which simulates the reading of a paper-based physical book.

The user device 104 may also include a content manager module 342. The purpose of the content manager module 342 is to allow the user to manage items available for consumption using the user device 104. For example, the content manager module 342 may allow the user to view a list of items available for consumption.

The content manager module 342 may also identify the sources of respective items: one such source corresponds to the device memory 336; another source corresponds to an attached portable memory (e.g., represented by the other source 338); another source corresponds to items identified in the personal media library module 324 (as may be revealed, in turn, by device-side metadata provided by the IPS 102); another source corresponds to subscription-related items identified by the subscription module 310, and so on. The content manager module 342 may allow the user to filter and sort the items in various ways. For example, the user may selectively view items which originate from the device store 336.

The user device 104 may also include a store interaction module 344. The store interaction module 344 may allow the user device 104 to interact with the merchant store module 318. The user may engage the store interaction module 344 to search and browse through items, to purchase items, to read and author customer reviews, and so on. As described above, the user may also use a personal computer or the like to interact with the merchant store module 318 via hardwired links.

Figure 4:
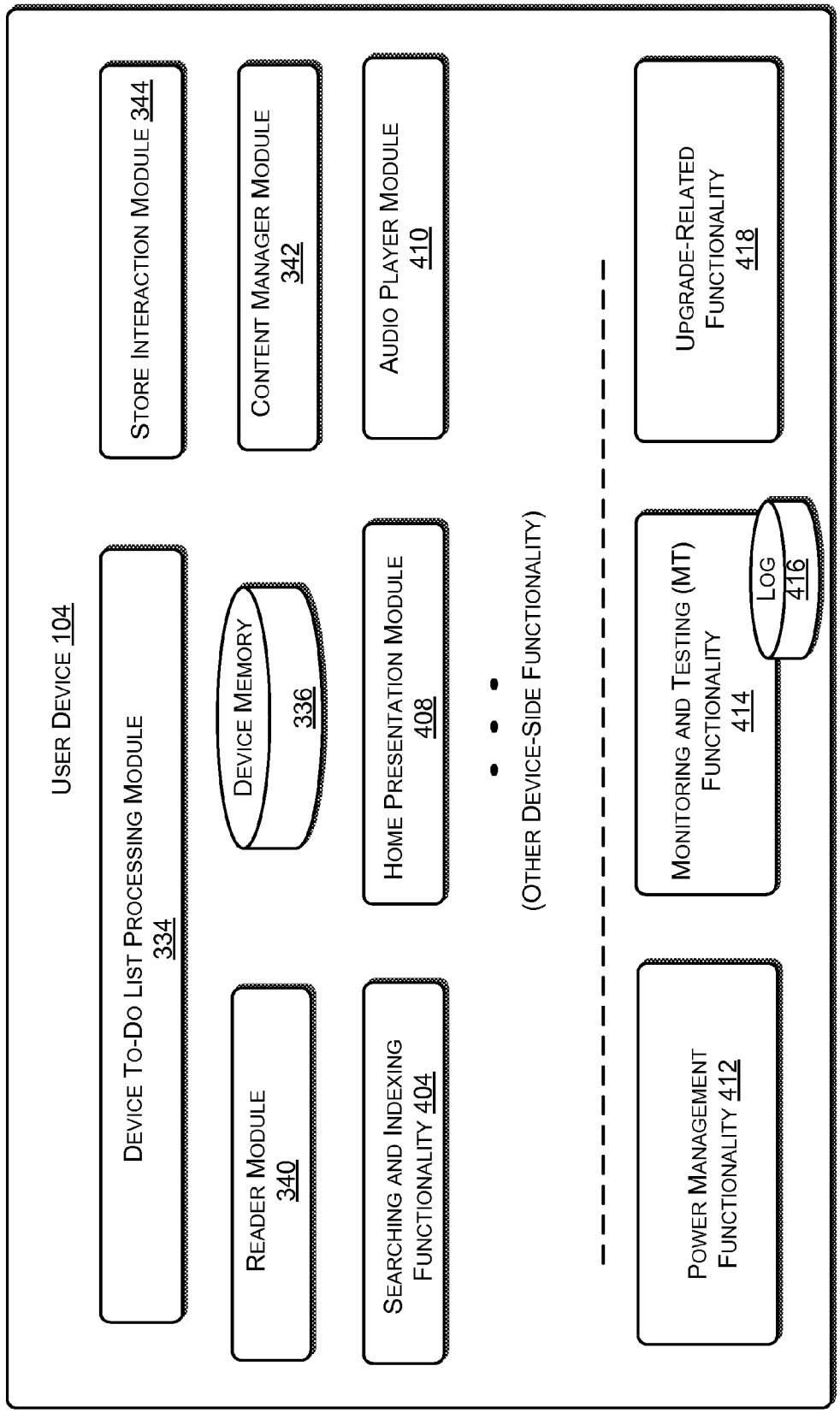
FIG. 4 shows one configuration of the user device.

The above-enumerated list of modules is representative and is not exhaustive of the types of functions performed by the user device 104. As indicated by the label "Other Device-Side Functionality," the user device 104 may include additional functions, many of which are described below. In fact, FIG. 4 shows additional device-side functionality. For completeness, FIG. 4 also identifies the various modules described above, including the device to-do list processing module 334, the device memory 336, the reader module 340, the content manager module 342, and the store interaction module 344. These features perform the functions described above.

FIG. 4 shows one configuration of the user device 104. The user device 104 may include searching and indexing functionality 404. The indexing aspect of this functionality 404 provides a mechanism for indexing an item received from the IPS 102 and/or for interacting with an index generated and supplied by the IPS 102 or by some other source. An index for a particular item (such as an eBook or newspaper edition) identifies the component parts (e.g., words) in the item, linking the component parts to their respective locations in the item. The searching aspect of the functionality 404 provides a mechanism for searching for identified components (e.g., words, phrases, etc.) in an item, and for performing other search-related functions. The searching aspect relies on the indexing aspect.

The user device 104 may also include a home presentation module 408. The home presentation module 408 may provide a home page when the user first turns on the user device and/or at other junctures. The home page may act as a general portal allowing a user to access media items and various features provided by the user device 104. In one illustrative case, the home page may present a summary of some (or all) of the items available for consumption using the user device 104.

The user device 104 may also include an audio play module 410. The audio player module 410 may provide an interface which allows the user to play back and interact with audio items, such as music, audio books and the like.

The above-described features of the user device 104 may pertain to applications with which the user may interact or which otherwise play a high-level role in the user's interaction with the user device 104. The user device 104 may include a number of other features to perform various lower-level tasks, possibly as background-type operations.

Power management functionality 412 performs one such background-type operation. More specifically, the power management functionality 412 corresponds to a collection of hardware and/or software features operating to manage the power consumed by the user device 104. The power management functionality 412 generally operates to reduce the power consumed by the device 104. The power management functionality 412 achieves this goal by selectively powering down features not actively being used (or for which there is an assumption these features are not actively being used). The power management functionality 412 achieves particularly noteworthy power savings by powering down features which make large power demands, such as one or more features associated with wireless communication.

The user device 104 may also include performance Monitoring and Testing (MT) functionality 414. The MT functionality 414 maintains a performance log 416 identifying the behavior of the device 104. The IPS 102 and/or other entities may access the performance log 416, along with other information gleaned from the communication infrastructure 106, to help diagnose anomalies in the operation of the user device 104 and the system 300 as a whole. The MT functionality 414 may also interact with testing functionality provided by the IPS 102 and/or other entities. For example, the MT functionality 414 may respond to test probes generated by the IPS 102.

The user device 104 may also include an upgrade-related functionality 418. The upgrade-related functionality 418 allows the user device 104 to receive and integrate instruction-bearing update items (such as software updates). In one case, the upgrade-related functionality 418 may automatically receive instruction-bearing items provided by the IPS 102 (and/or by other entities). An administrator at the IPS 102 may manually initiate the upgrade procedure by which an instruction-bearing update item is forwarded to the user device 104. Or an automated IPS-side routine may initiate the upgrade procedure. In any event, the user device may receive the instruction-bearing update item without the involvement of the user or with minimal involvement from the user. In this sense, the upgrade procedure may be viewed as "transparent." In another case, the upgrade-related functionality 418 may be operated by the user to manually access a source of instruction-bearing items (such as a prescribed website or the like) and download an item from this source.

To repeat, the above-enumerated list of modules is representative and is not exhaustive of the types of functions performed by the user device 104. As indicated by the label "Other Device-Side Functionality," the user device 104 may include additional functions.

The IPS 102 described above may interact with any type of user device 104. In one case, the user device 104 is a portable-type device, meaning a device designed to be readily carried from location to location. In one specific case, the user device 104 allows the user to consume the media items while holding the user device 104, e.g., in a manner which simulates the way a user might hold a physical book. A portable user device may take the form of an eBook reader device, a portable music player, a personal digital assistant, a mobile telephone, a game module, a laptop computer, and so forth, and/or any combination of these types of devices. Alternatively, or in addition, the user device 104 may correspond to a device not readily portable, such as a personal computer, set-top box associated with a television, gaming console, and so on.

Figure 5:
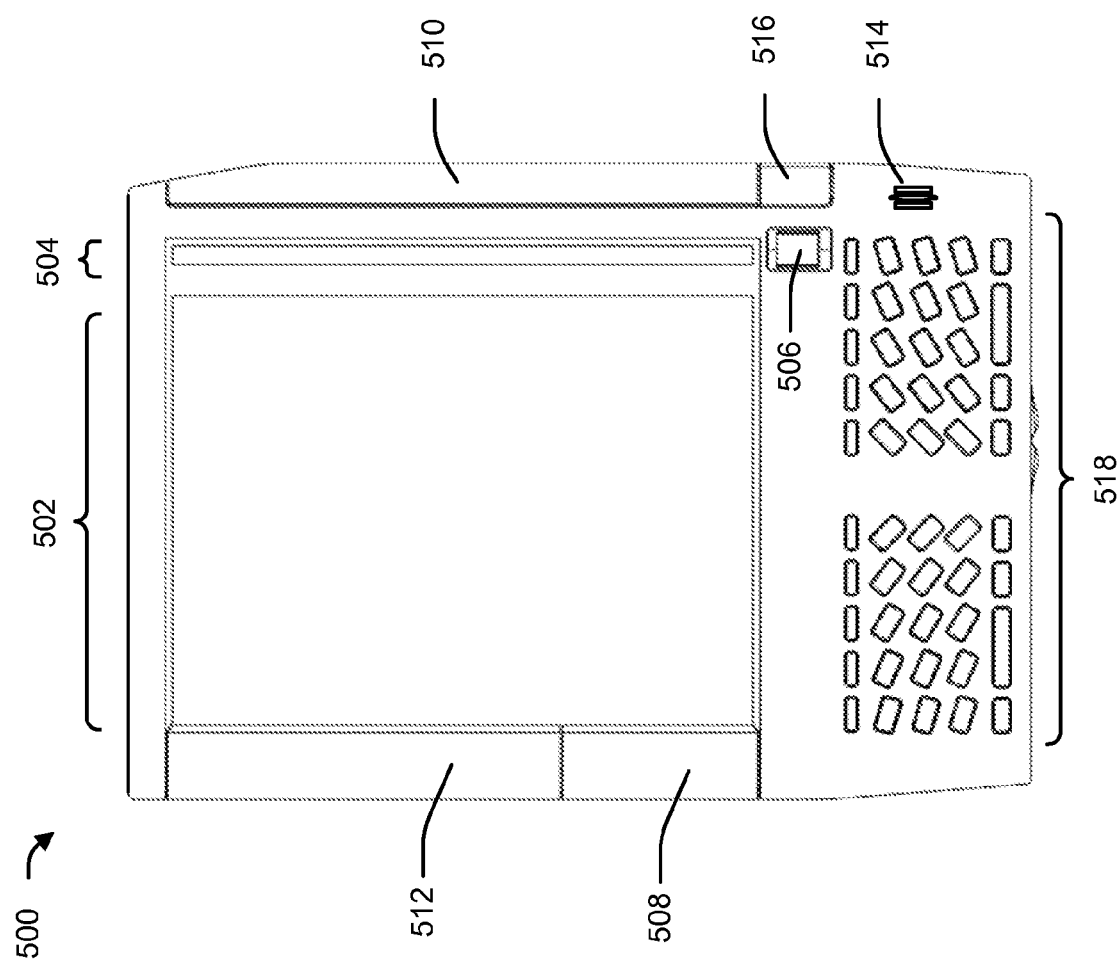
FIG. 5 shows one type of user device which may be used to interact with the IPS.

Without limitation, FIG. 5 shows one type of user device 500 which may be used to interact with the IPS 102. The user device 500 may include a wedge-shaped body designed to fit easily in the hands of a user, generally having the size of a paperback book. Other user devices may adopt different shapes and sizes.

In one representative design, the user device 500 includes two display parts: a main display part 502 and a supplemental display part 504. The main display part 502 presents various pages provided by the store interaction module 344, the reader module 340, and so on. In one case, the supplemental display part 504 is used to present a cursor. The user may position the cursor to identify laterally adjacent portions in the main display part 502. Without limitation, in one illustrative case, the main display part 502 and/or the supplemental display part 504 may be implemented using electronic paper technology, such as provided by E Ink Corporation of Cambridge, Mass. This technology presents information using a non-volatile mechanism; using this technology, the user device 500 may retain information on its display even when the device is powered off.

The user device 500 includes various input keys and mechanisms. A cursor-movement mechanism 506 allows a user to move a cursor within the supplemental display part 504. In one representative case, the cursor-movement mechanism 506 may include a cursor wheel that may be rotated to move a cursor up and down within the supplemental display part 504. The cursor-movement mechanism 506 may be configured to allow the user to make a selection by pressing down the wheel. Other types of selection mechanisms may be used, such as a touch-sensitive display, a series of vertically and/or horizontally arrayed keys along the edge(s) of the main display part 502, one or more graphical scroll bar(s) in the main display part 502, and so on.

The user device 500 also includes various page-turning buttons, such as next page buttons (508, 510) and a previous page button 512. The next page buttons (508, 510) advance the user to a next page in an item (relative to a page that is currently being displayed). The previous page 512 button advances the user to a previous page in an item (relative to a page that is currently being displayed). The user device 500 may also include a page-turning input mechanism 514 actuated by the user's thumb as it passes over the mechanism 514. This user experience simulates the manner in which a user turns a page in a physical book (e.g., by "thumbing through" a book). The user device 500 may also include a back button 516 allowing the user to advance to a previous page when using the browsing module 402. Although not shown, the user device 500 may include a switch for turning power on and off, a switch for enabling and disabling a wireless interface, and so on. The user device 500 may also include a keyboard 518. The keyboard 518 may include alphanumeric keys. The keys may be shaped and oriented in a manner which facilitates the user's interaction with the keys while the user holds the device 104 in the manner of a physical book. The user may use the keyboard 518 to enter search terms, annotations, URLs, and so forth. The user may also use the keyboard 518 to respond to testing content. The keyboard 518 may also include various special-function keys.

One aspect of the present disclosure relates to techniques for efficiently storing index data. In this context, the term "index data" refers to data that may facilitate fast and accurate retrieval of information. Index data may be the result of a process that is referred to as indexing.

The techniques disclosed herein may be applicable to storing index data on an electronic device, such as an electronic book ("e-book") reader. The index data may include information about items on the electronic device, such as e-books. Index data may be generated and stored in order to optimize speed and performance in finding relevant items (e.g., e-books) in response to a user's search query.

Figure 6:
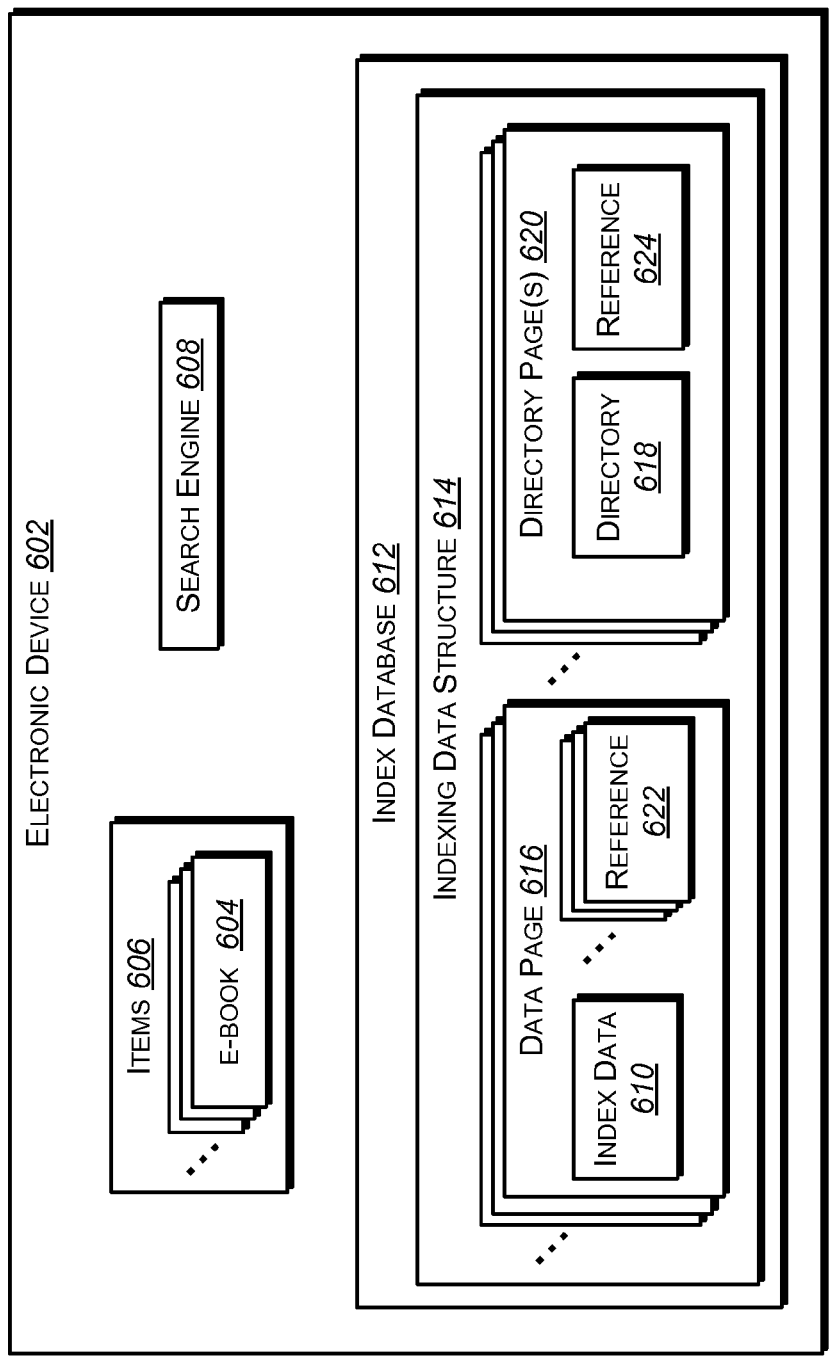
FIG. 6 illustrates an example of an electronic device that is configured for efficiently storing index data.

Reference is now made to FIG. 6. FIG. 6 illustrates an example of an electronic device 602 that is configured for efficiently storing index data 610.

Various items 606 may be included on the electronic device 602. For example, if the electronic device 602 is an e-book reader, the items 606 on the electronic device 602 may include e-books 604.

The electronic device 602 may include a search engine 608. The search engine 608 may permit a user to search for items 606 on the electronic device 602 that meet certain criteria. The index data 610 may speed up the process of finding relevant items 606 on the electronic device 602. For example, in response to a user's search query, the search engine 608 may search the index data 610 instead of searching all of the items 606 on the electronic device 602. The index data 610 may result from indexing items 606, such as e-books 604, that are stored on the electronic device 602.

The index data 610 may be stored in a data structure 614 within an index database 612. This data structure 614 may be referred to herein as an indexing data structure 614.

The indexing data structure 614 may include a number of pages. In this context, the term "page" refers to a logical element of the indexing data structure 614. Some of the pages within the indexing data structure 614 may be used to store index data 610. These pages may be referred to herein as data pages 616. Other pages within the indexing data structure 614 may be used to store a directory 618 of data pages 616. These pages may be referred to herein as directory pages 620.

The directory 618 of data pages 616 may include information showing the memory location (e.g., one or more blocks of memory) where each data page 616 is stored on the electronic device 602. The size of each page (e.g., each data page 616 and/or each directory page 620) may correspond to some multiple N of the size of a block of memory, where the value of N may be any positive integer.

Under some circumstances, multiple directory levels may be provided, although this is not shown in FIG. 6. Multiple directory levels may be provided when the number of data pages 616 within the indexing data structure 614 has increased to the point that the directory 618 of data pages 616 does not fit within a single directory page 620. This will be explained in greater detail below.

The indexing data structure 614 may be organized so as to implement a tree structure. To achieve this, each data page 616 may include one or more references 622 to one or more other data pages 616. Also, if there are multiple directory pages 620 (e.g., if there are multiple directory levels), at least some of the directory pages 620 may include a reference 624 to another directory page 620.

Figure 7:
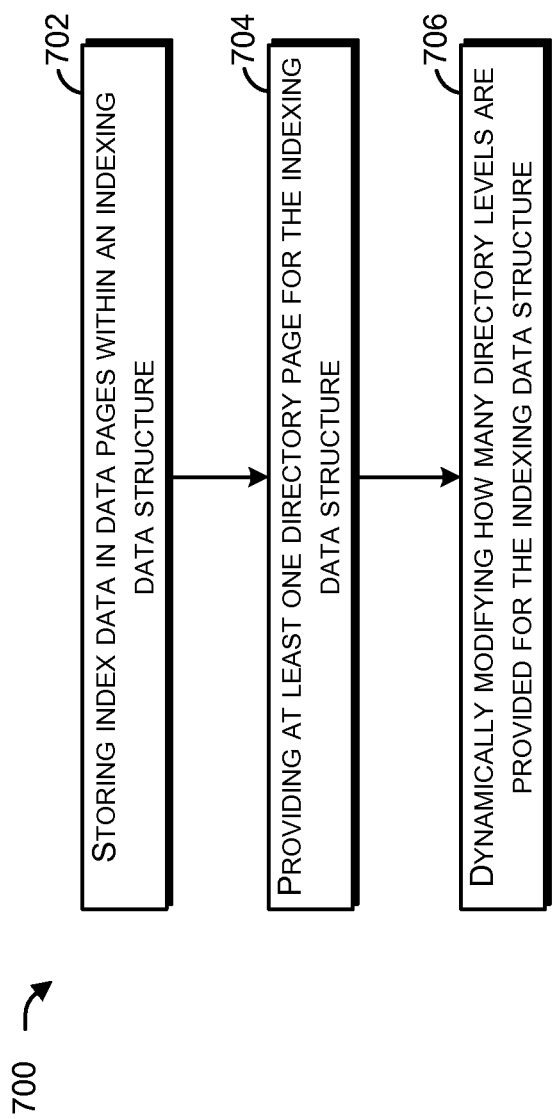
FIG. 7 illustrates an example of a method for efficiently storing index data on an electronic device.

Reference is now made to FIG. 7. FIG. 7 illustrates an example of a method 700 for efficiently storing index data on an electronic device. The method 700 may be implemented by an electronic device, such as the electronic device 602 that is shown in FIG. 6.

The method 700 may include storing 702 index data in data pages within an indexing data structure. The index data may be the result of indexing items (e.g., e-books) on an electronic device. The index data may be used by a search engine to speed up the process of finding relevant items on the electronic device.

The method 700 may also include providing 704 at least one directory page for the indexing data structure. The directory page(s) may be used to store a directory of data pages. This directory of data pages may include information showing the memory location (e.g., one or more blocks of memory) where each data page is stored on the electronic device.

The method 700 may also include dynamically modifying 706 how many directory levels are provided for the indexing data structure. For example, one or more directory levels may be added to the indexing data structure as the amount of index data in the indexing data structure increases. Conversely, one or more directory levels may be deleted from the indexing data structure as the amount of index data in the indexing data structure decreases.

Figure 8:
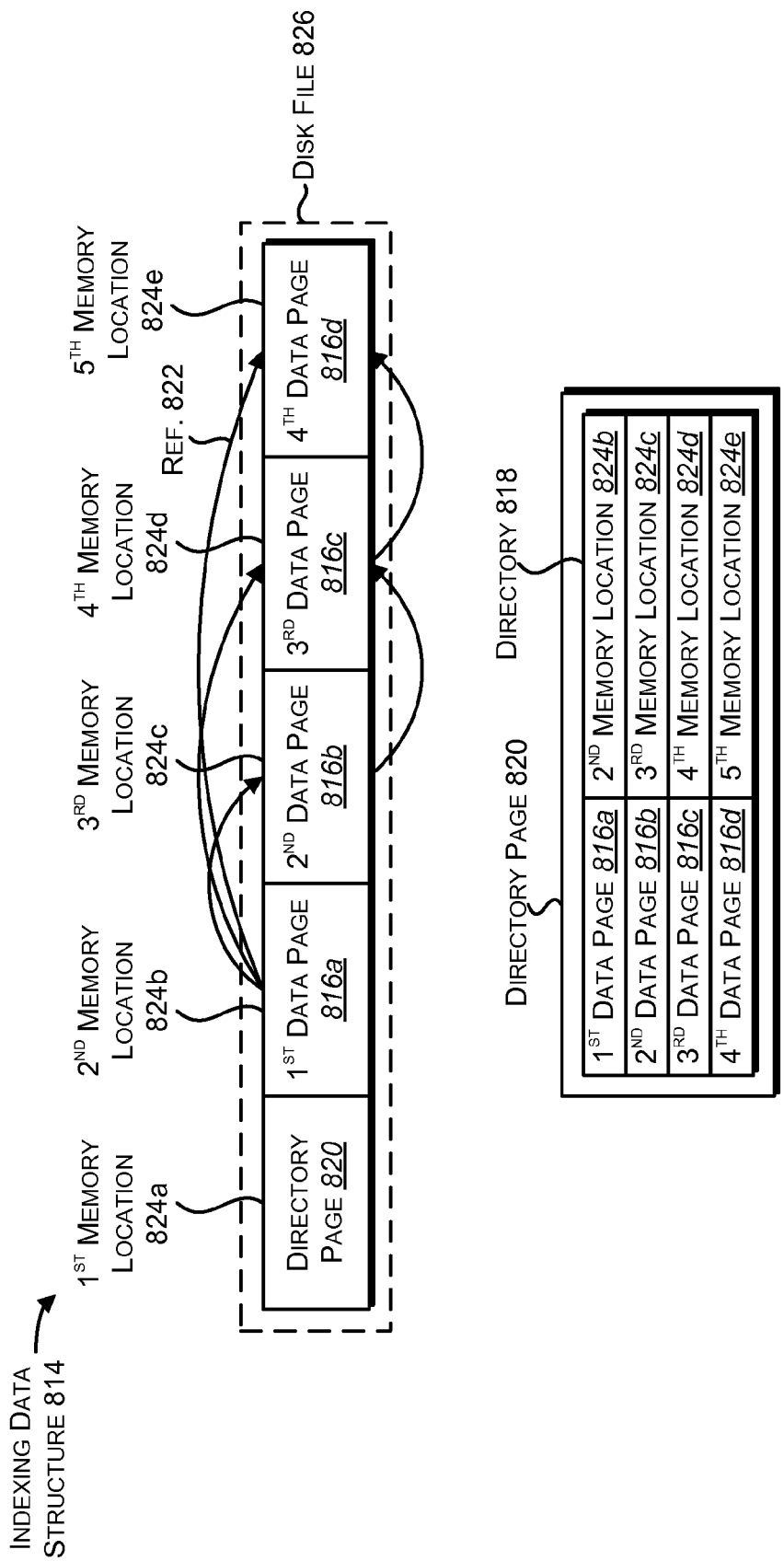
FIGS. 8-10 illustrate an example showing how a directory page may be provided for an indexing data structure.
Figure 9:
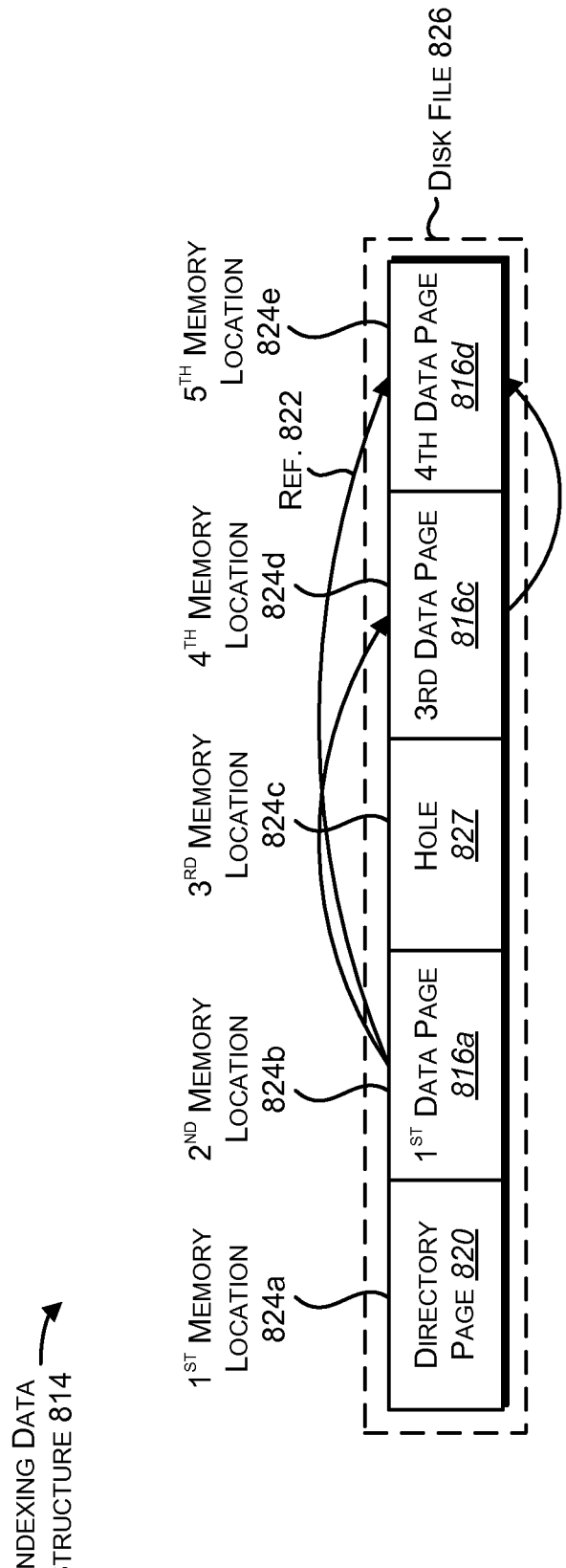
Figure 10:
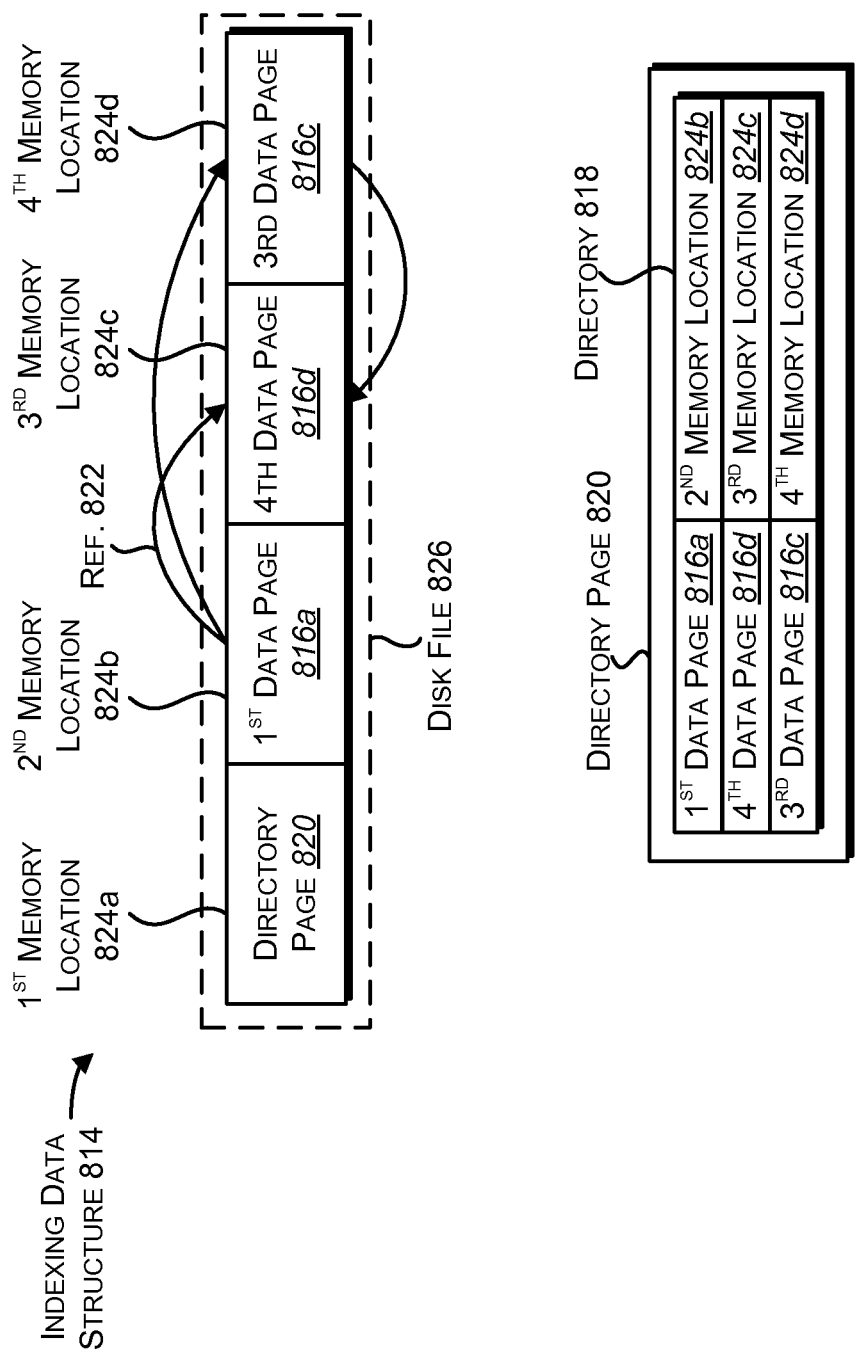

Reference is now made to FIGS. 8 through 10. FIGS. 8 through 10 illustrate an example showing how a directory page 820 may be provided for an indexing data structure 814 in accordance with the present disclosure.

Reference is initially made to FIG. 8. In addition to the directory page 820, the indexing data structure 814 also includes multiple data pages 816a-d. The directory page 820 and the data pages 816a-d may be stored in various memory locations 824a-e. The memory locations 824a-e may be contiguous, e.g., if the indexing data structure 814 is stored within a single disk file 826.

The data pages 816 may include various references 822 to other data pages 816 in order to implement a tree structure. The directory page 820 may include a directory 818. The directory 818 may include information showing the memory location 824 where each data page 816 is stored.

A software module that is traversing the indexing data structure 814 (e.g., a search engine) may refer to the directory 818 to determine the memory location 824 of a particular data page 816. For example, suppose that a search engine encounters the reference 822 from the first data page 816a to the fourth data page 816d. The search engine may then refer to the directory 818 to determine that the fourth data page 816d is stored in the fifth memory location 824e. After making this determination, the search engine may access the fifth memory location 824e and read the contents of the fourth data page 816d.

Thus, in accordance with the present disclosure, the memory locations 824 corresponding to data pages 816 may be stored in a directory 818 within a directory page 820. This may be useful because data pages 816 may be moved from time to time, as will be described immediately below.

As the amount of index data that is stored in the indexing data structure 814 changes, data pages 816 may be added or removed from the indexing data structure 814. Therefore, it is possible that there may be one or more holes in the middle of the disk file 826 that is used to store the indexing data structure 814.

For example, suppose that the second data page 816b is deleted. If this were to occur, as shown in FIG. 9, there would then be a hole 827 in the disk file 826 in the third memory location 824c, where the second data page 816b used to be. This memory location 824c is no longer being used to store a data page 816, but it still consumes space, because space can only be freed if it is at the end of the disk file 826.

To address this, a data page 816 at the end of the disk file 826 (e.g., the fourth data page 816d) may be moved to fill the hole 827, as shown in FIG. 10. The directory 818 may then be updated to reflect the new memory location 824 (e.g., the third memory location 824c) for the fourth data page 816d. Therefore, even though the memory location 824 where the fourth data page 816d is stored has been changed, a search engine may still access the fourth data page 816d by looking up the current memory location 824c for the fourth data page 816d in the directory 818.

The use of a directory 818 as described herein therefore allows data pages 816 to be moved around within an indexing data structure 814. Advantageously, when a data page 816 is moved, it is not necessary to rewrite the references 822 to that data page 816 which may exist in other data pages 816. Rewriting each reference 822 to the data page 816 may be costly both in terms of time and also in terms of battery power for the electronic device where the indexing data structure 814 is stored. This may be due at least in part to the fact that each data page 816 that included a reference 822 to the moved data page 816 would be rewritten in its entirety. (Writing to any part of a data page 816 typically requires rewriting the entire data page 816.) Instead of rewriting what may turn out to be a significant portion of the disk file 826 whenever a data page 816 is moved, the directory 818 may simply be updated to reflect the new memory location 824 for the data page 816.

As indicated above, a method for efficiently storing index data in accordance with the present disclosure may include dynamically modifying how many directory levels are provided for an indexing data structure. For example, one or more directory levels may be added to an indexing data structure as the amount of index data (e.g., the number of data pages) in the indexing data structure increases.

Figure 11:
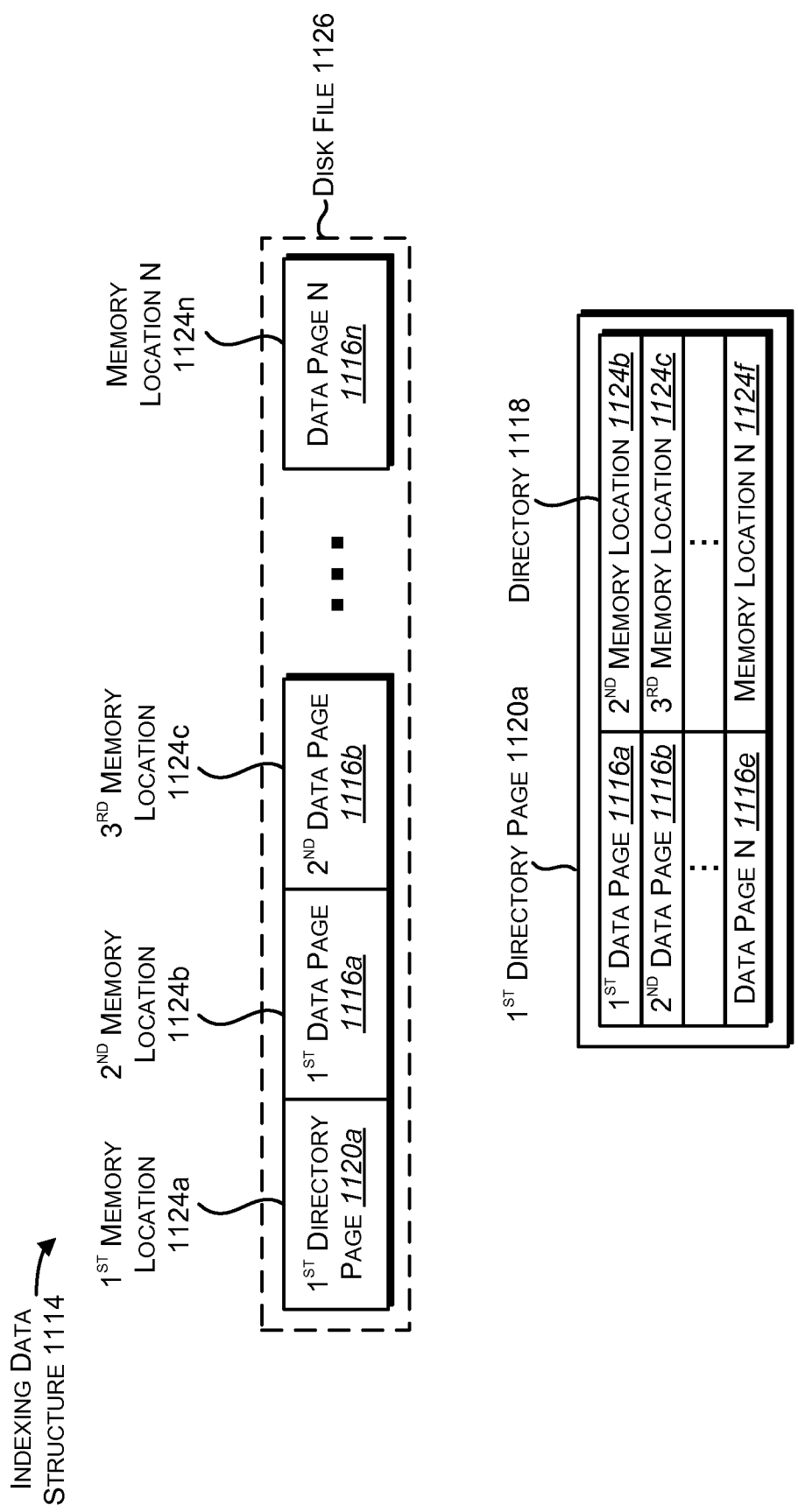
FIGS. 11-12 illustrate an example showing how an additional directory level may be dynamically added to an indexing data structure.
Figure 12:
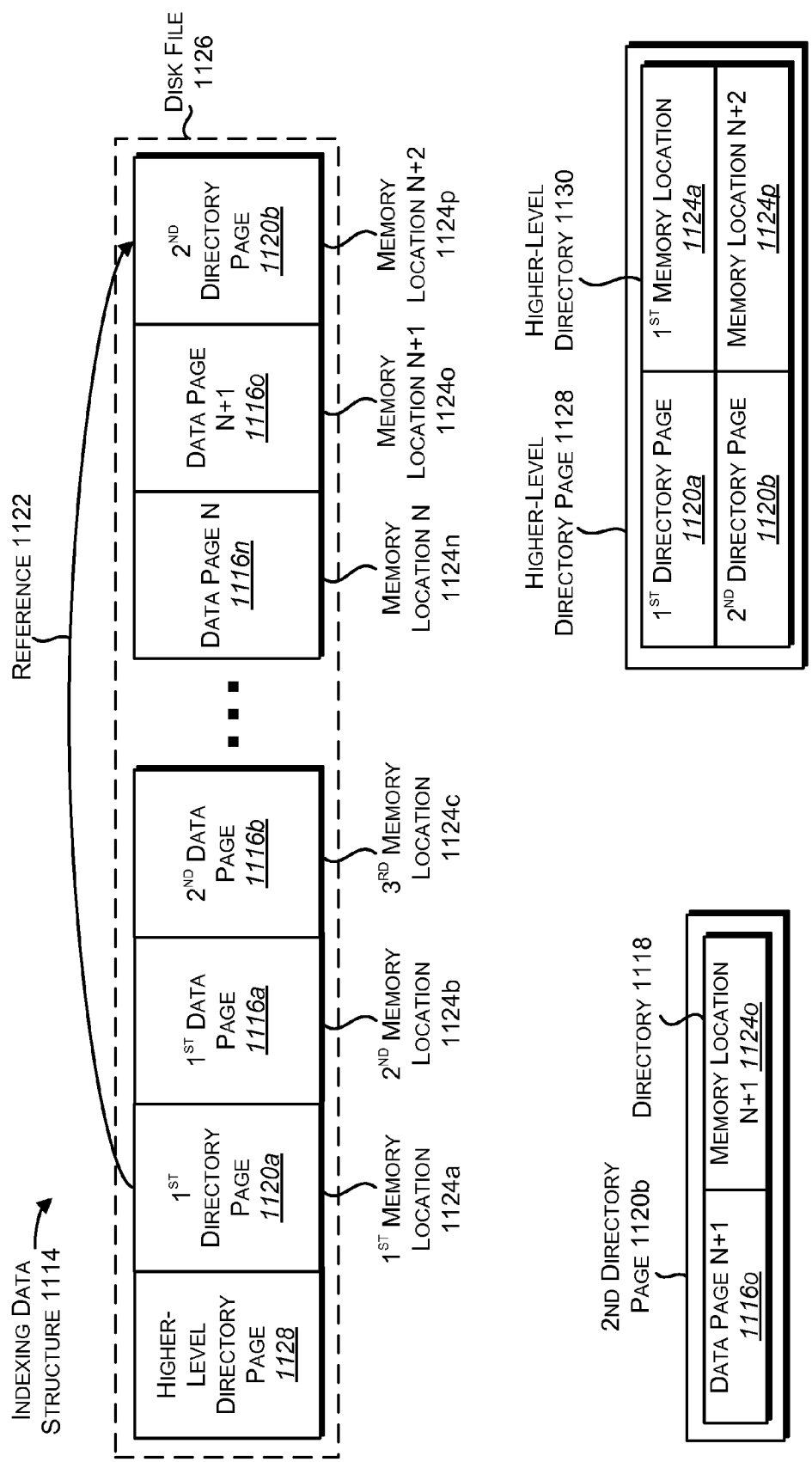

Reference is now made to FIGS. 11 and 12. FIGS. 11 and 12 illustrate an example showing how an additional directory level may be dynamically added to an indexing data structure 1114 in accordance with the present disclosure.

Referring initially to FIG. 11, an indexing data structure 1114 is shown with N data pages 1116a-n. The indexing data structure 1114 also includes a first directory page 1120a. The first directory page 1120a includes a directory 1118, which includes information about the memory location 1124 where each data page 1116 in the indexing data structure 1114 is stored.

Referring now to FIG. 12, at some point another data page 1116 (i.e., data page N+1 1116o) may be added to the indexing data structure 1114. Suppose that the first directory page 1120a is only large enough to store the part of the directory 1118 that corresponds to N data pages 1116a-n. If this is the case, when data page N+1 1116o is added to the indexing data structure 1114, a second directory page 1120b may be created. The second directory page 1120b may include the part of the directory 1118 that is not stored in the first directory page 1120a. In this example, the memory location 1124o of the newly added data page 1116o is the part of the directory 1118 that is stored in the second directory page 1120b. The first directory page 1120a may be modified to include a reference 1122 to the second directory page 1120b.

In addition to creating the second directory page 1120b, a higher-level directory page 1128 may also be created. The higher-level directory page 1128 may include a higher-level directory 1130, which may include information about the memory locations 1124a, 1124p where the first directory page 1120a and the second directory page 1120b are stored.

The example of FIGS. 11 and 12 illustrates an indexing data structure 1114 with two directory levels: a first directory level corresponding to the directory 1118 that is stored in the first directory page 1120a and the second directory page 1120b, and a second directory level corresponding to the higher-level directory 1130. The directory 1118 that is stored in the first directory page 1120a and the second directory page 1120b may be referred to as a "lower-level" directory with respect to the higher-level directory 1130.

Having a higher-level directory 1130 may permit the directory pages 1120 corresponding to the lower-level directory 1118 (i.e., the first directory page 1120a and the second directory page 1120b) to be moved, if needed. Whenever a directory page 1120 corresponding to the lower-level directory 1118 is moved, then the higher-level directory 1130 may be updated to reflect the current memory location 1124 of the directory page 1120 that has been moved.

In order to determine the memory location 1124 where a particular data page 1116 is stored, a search engine may initially refer to the higher-level directory page 1128 in order to determine the memory location 1124a of the first directory page 1120a. Once the memory location 1124a of the first directory page 1120a has been determined, the search engine may then access the first directory page 1120a. If the memory location 1124 of the data page 1116 under consideration is not found within the portion of the directory 1118 that is stored in the first directory page 1120a, then the search engine may determine the memory location 1124p of the second directory page 1120b. The memory location 1124p of the second directory page 1120b may be stored in the first directory page 1120a. The search engine may then access the second directory page 1120b and look for the desired memory location 1124 there.

The example of FIGS. 11 and 12 illustrates how a second directory level (i.e., the higher-level directory 1130) may be added to an indexing data structure 1114 when the number of data pages 1116 within the indexing data structure 1114 has increased such that a directory page 1120a corresponding to a lower-level directory 1118 is not sufficiently large to store the entire lower-level directory 1118.

Figure 13:
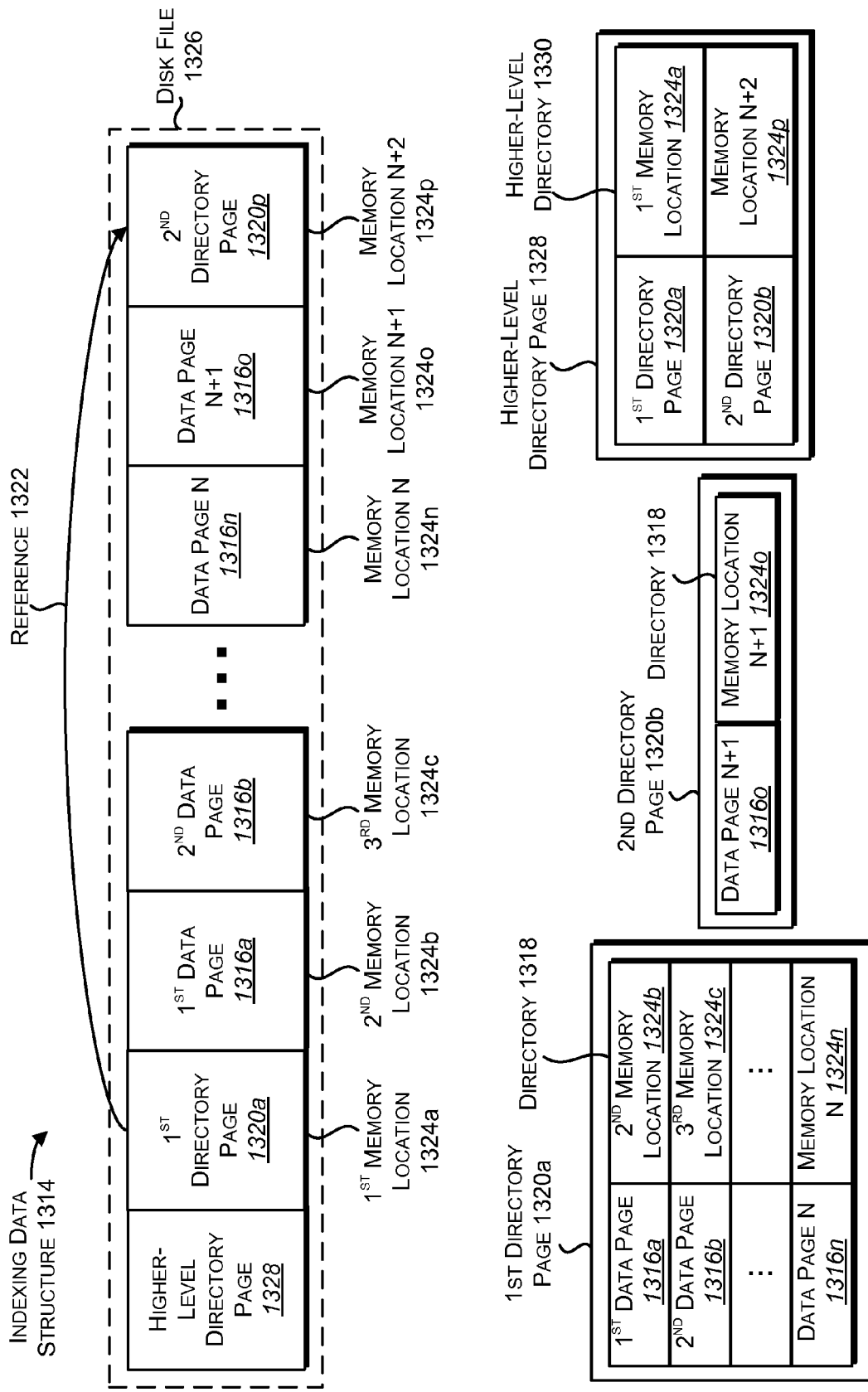
FIGS. 13-14 illustrate an example showing how a directory level may be dynamically removed from an indexing data structure.
Figure 14:
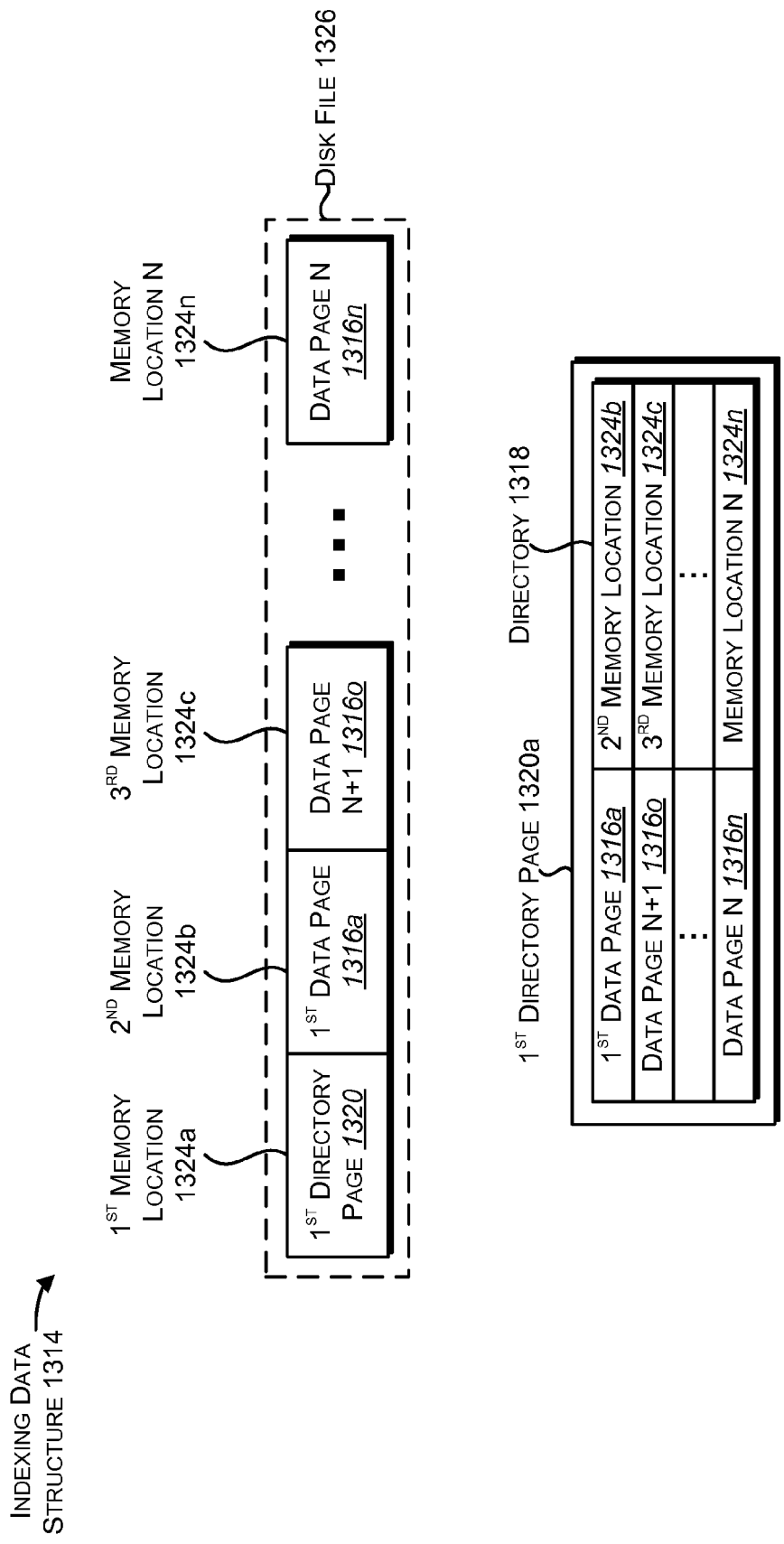

Reference is now made to FIGS. 13 and 14. FIGS. 13 and 14 illustrate an example showing how a directory level may be dynamically removed from an indexing data structure 1314 in accordance with the present disclosure.

Referring initially to FIG. 13, an indexing data structure 1314 is shown with N data pages 1316a-n. The indexing data structure 1314 shown in FIG. 13 is similar to the indexing data structure 1114 that is shown in FIG. 12, and similar elements are labeled with similar reference numbers (e.g., the higher-level directory page 1328 in FIG. 13 corresponds to the higher-level directory page 1128 in FIG. 11).

For purposes of this example, it will be assumed that each directory page 1320 is only large enough to store information about N data pages 1316. The indexing data structure 1314 in FIG. 13 includes N+1 data pages 1316. At some point, one or more data pages 1316 within the indexing data structure 1314 may be deleted. In this example, if one or more data pages 1316 are deleted, then there would be only N data pages 1316 remaining in the indexing data structure 1314, and the first directory page 1320a would be able to store the entire directory 1318. Therefore, if one or more data pages 1316 are deleted from the indexing data structure 1314, the higher-level directory page 1328 and the higher-level directory 1330 may be deleted from the indexing data structure 1314.

Reference is now made to FIG. 14. Suppose that the second data page 1316b is deleted. Because there would now only be N data pages 1316 in the indexing data structure 1314, the contents of the second directory page 1320b may be added to the first directory page 1320a, and the second directory page 1320b may be deleted. In addition, the higher-level directory page 1328 may be deleted. To fill the hole in the third memory location 1324c that was left by deleting the second data page 1316b, data page N+1 1316o may be moved to the third memory location 1324c.

The example of FIGS. 13A and 13B illustrates how a directory level may be removed from an indexing data structure 1314 when the number of data pages 1316 within the indexing data structure 1314 has decreased such that a directory page 1320a corresponding to a lower-level directory 1318 is sufficiently large to store the entire lower-level directory 1318.

The examples that are shown in FIGS. 11-12 and 13-14 involve the use of two directory levels within an indexing data structure. However, an indexing data structure may include more than two directory levels in accordance with the present disclosure.

Additionally, the examples that are shown in FIGS. 11-12 and 13-14 involve the addition or removal of a single directory level from an indexing data structure. However, more than one directory level may be added to or removed from an indexing data structure at any given time.

The techniques disclosed herein for dynamically modifying how many directory levels are provided for an indexing data structure may be expressed generally as follows: Whenever the number of data pages in the indexing data structure has increased such that the "root" directory (defined below) occupies more than one directory page, another directory level may be added. Conversely, whenever the number of data pages in the indexing data structure has decreased such that any non-root directory shrinks to one directory page, then this directory can become the root directory again (and all directories from the old root directory down to it can be eliminated).

Where there are multiple directory levels, the highest-level directory may be referred to as the "root" directory. For example, referring to FIG. 13, the higher-level directory 1330 may be referred to as the root directory in the indexing data structure 1314. When the higher-level directory 1330 is deleted, as shown in FIG. 14, then the directory 1318 that remains may then be referred to as the root directory.

Figure 15:
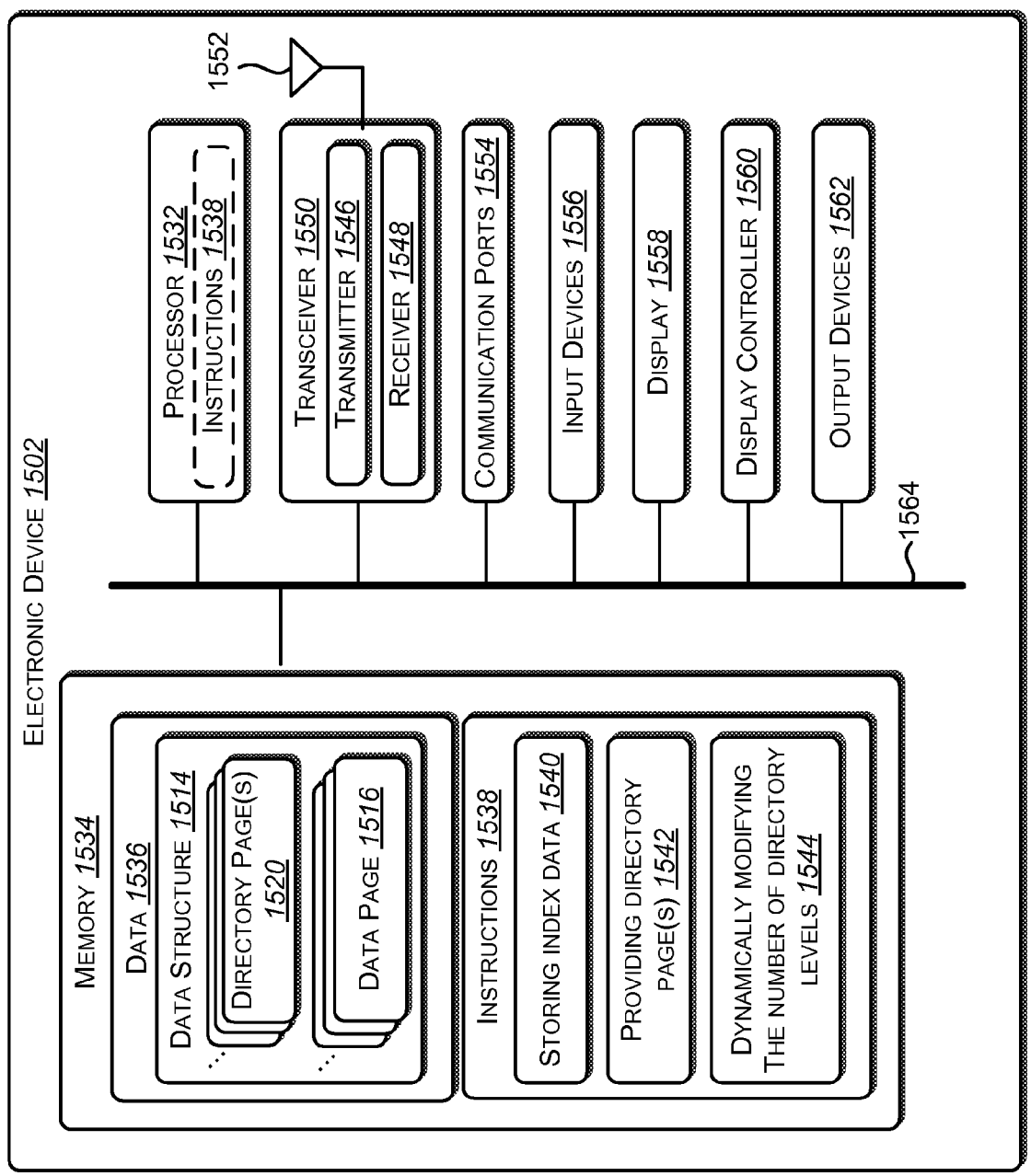
FIG. 15 illustrates certain components that may be included within an electronic device that is configured for efficiently storing index data.

Reference is now made to FIG. 15. FIG. 15 illustrates certain components that may be included within an electronic device 1502 that is configured for efficiently storing index data in accordance with the present disclosure.

The electronic device includes a processor 1532. The processor 1532 may be a general purpose single- or multi-chip microprocessor (e.g., an ARM), a special purpose microprocessor (e.g., a digital signal processor (DSP)), a microcontroller, a programmable gate array, etc. The processor 1532 may be referred to as a central processing unit (CPU). Although just a single processor 1532 is shown in the electronic device 1502 of FIG. 15, in an alternative configuration, a combination of processors (e.g., an ARM and DSP) could be used.

The electronic device 1502 also includes memory 1534. The memory 1534 may be any electronic component capable of storing electronic information. The memory 1534 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1536 and instructions 1538 may be stored in the memory 1534. The instructions 1538 may be executable by the processor 1532 to implement various functions. Executing the instructions 1538 may involve the use of the data 1536 that is stored in the memory 1534.

Some examples of the data 1536 in the memory 1534 include: one or more indexing data structures 1514 that may be used to store index data, data pages 1516 within the indexing data structure(s), directory page(s) 1520 within the indexing data structure(s), etc. Other types of data 1536 that are relevant to implementing the techniques described herein may also be included in the memory 1534.

Some examples of the instructions 1538 in the memory 1534 include: instructions 1540 for storing index data in data pages 1516 within an indexing data structure 1514, instructions 1542 for providing at least one directory page 1520 for the indexing data structure 1514, and instructions 1544 for dynamically modifying how many directory levels are provided for the indexing data structure 1514. Other instructions 1538 that are relevant to implementing the techniques described herein may also be included in the memory 1534.

The electronic device 1502 may also include a transmitter 1546 and a receiver 1548 to allow transmission and reception of signals between the electronic device 1502 and a remote location. The transmitter 1546 and receiver 1548 may be collectively referred to as a transceiver 1550. An antenna 1552 may be electrically coupled to the transceiver 1550. The electronic device 1502 may also include (not shown) multiple transmitters, multiple receivers, multiple transceivers and/or multiple antenna.

The electronic device 1502 may also include one or more communication ports 1554 for communicating with other electronic devices. Communication with other electronic devices may occur directly and/or via a computer network. Some examples of communication ports 1554 include Ethernet ports, Universal Serial Bus (USB) ports, parallel ports, serial ports, etc.

The electronic device 1502 may also include one or more input devices. Examples of input devices 1556 include a keyboard, mouse, remote control device, microphone, button, joystick, trackball, touchpad, lightpen, etc.

The electronic device 1502 may also include a display 1558. A display controller 1560 may also be provided, for converting data 1536 stored in the memory 1534 into text, graphics, and/or moving images (as appropriate) shown on the display 1558.

The display 1558 may be an electronic paper display, which is a display that is capable of holding text and images indefinitely without drawing electricity, while allowing the text and images to be changed later. There are several different technologies that may be used to create an electronic paper display, including electrophoretic display technology, bistable liquid crystal display (LCD) technology, cholesteric LCD display technology, etc. Alternatively, the display 1558 may utilize another image projection technology, such as liquid crystal display (LCD), gas plasma, light-emitting diode (LED), etc. One or more other output devices 1562, such as audio speakers, may also be included in the electronic device 1502.

The various components of the electronic device 1502 may be coupled together by one or more buses, which may include a power bus, a control signal bus, a status signal bus, a data bus, etc. For the sake of clarity, the various buses are illustrated in FIG. 15 as a bus system 1564.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "electronic device 602" refers to the specific electronic device that is shown in FIG. 6. However, the use of "electronic device" without a reference number refers to any electronic device that is appropriate for the context in which the term is used, and is not limited to any particular electronic device shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for efficiently storing index data on an electronic book (e-book) reader, comprising:
   storing the index data in data pages within an indexing data structure on the e-book reader, wherein the indexing data structure is stored in a disk file;
   providing at least one directory for the indexing data structure; and
   dynamically modifying how many directory levels are provided for the indexing data structure in response to changes to a number of data pages within the indexing data structure, wherein the dynamically modifying includes:
      identifying an unused memory location within the indexing data structure; and
      removing a directory level when changes to the data pages within the indexing data structure includes moving a data page from within the indexing data structure to the unused memory location within the indexing data structure causing the number of data pages within the indexing data structure to decrease such that a directory page corresponding to a lower-level directory is sufficiently large to store the entire lower level directory, wherein
         each directory page stores a directory of one or more of the data pages, and
         the moving the data page to the unused memory location frees disk space formerly storing the data page at the end of the disk file on the e-book reader.

2. The method of claim 1, wherein each directory is stored in one or more directory pages within the indexing data structure.

3. The method of claim 1, wherein the at least one directory comprises information about memory locations where the data pages are stored.

4. The method of claim 1, wherein the at least one directory comprises a higher-level directory and a lower-level directory, and wherein the higher-level directory comprises information about memory locations where lower-level directory pages are stored.

5. The method of claim 1, wherein the dynamically modifying how many directory levels are provided for the indexing data structure comprises adding one or more directory levels to the indexing data structure.

6. The method of claim 5, wherein the one or more directory levels are added to the indexing data structure when the number of data pages within the indexing data structure has increased such that a directory page corresponding to a lower-level directory is not sufficiently large to store the entire lower level directory.

7. The method of claim 1, wherein the index data results from indexing e-books that are stored on the e-book reader.

8. The method of claim 1, wherein the changes to the data pages within the indexing data structure further include adding the data page to the indexing data structure in the unused memory location within the indexing data structure in an event the unused memory location exists within the indexing data structure and adding the data page to the end of the indexing data structure in the event the unused memory location does not exist within the indexing data structure.

9. An electronic book (e-book) reader that is configured for efficiently storing index data, comprising:
a processor;
memory in electronic communication with the processor;
instructions stored in the memory, the instructions being executable to:
store the index data in data pages within an indexing data structure on the e-book reader, wherein the indexing data structure is stored in a disk file;
provide at least one directory for the indexing data structure; and
dynamically modify how many directory levels are provided for the indexing data structure in response to changes to a number of data pages within the indexing data structure, wherein the dynamically modifying includes:
identifying an unused memory location within the indexing data structure; and
removing a directory level when changes to the data pages within the indexing data structure includes moving a data page from the indexing data structure to the unused memory location within the indexing data structure causing the number of data pages within the indexing data structure to decrease such that a directory page corresponding to a lower-level directory is sufficiently large to store the entire lower level directory, wherein
each directory page stores a directory of one or more of the data pages, and
the moving the data page to the unused memory location frees disk space formerly storing the data page at the end of the disk file on the e-book reader.

10. The e-book reader of claim 9, wherein the at least one directory comprises information about memory locations where the data pages are stored.

11. The e-book reader of claim 9, wherein the at least one directory comprises a higher-level directory and a lower-level directory, and wherein the higher-level directory comprises information about memory locations where lower-level directory pages are stored.

12. The e-book reader of claim 9, wherein the dynamically modifying how many directory levels are provided for the indexing data structure comprises adding one or more directory levels to the indexing data structure when the number of data pages within the indexing data structure has increased such that a directory page corresponding to a lower-level directory is not sufficiently large to store the entire lower level directory.

13. The e-book reader of claim 9, wherein the changes to the data pages within the indexing data structure further include adding the data page to the indexing data structure in the unused memory location within the indexing data structure in an event there is an unused memory location within the indexing data structure and adding the data page to the end of the indexing data structure in the event no unused memory location exists within the indexing data structure.

14. A non-transitory computer-readable storage medium for efficiently storing index data on an electronic book (e-book) reader, the computer-readable storage medium comprising executable instructions for:
storing the index data in data pages within an indexing data structure on the e-book reader;
providing at least one directory for the indexing data structure; and
dynamically modifying how many directory levels are provided for the indexing data structure in response to changes to the data pages within the indexing data structure, wherein the dynamically modifying includes removing a directory level when the changes to the data pages within the indexing data structure include moving a data page from within the indexing data structure to a formerly used memory location within the indexing data structure that previously contained data, if the formerly used memory location exists, which causes a number of data pages within the indexing data structure to decrease such that a directory page corresponding to a lower-level directory is sufficiently large to store the entire lower level directory, wherein,
each directory page stores a directory of one or more of the data pages, and
the changes to the data pages within the indexing data structure further include:
adding the data page to the indexing data structure in the formerly used memory location in the indexing data structure in an event the formerly used memory location exists in the indexing data structure, and
adding the data page to the end of the indexing data structure in the event no formerly used memory location exists in the indexing data structure.

15. The computer-readable storage medium device of claim 14, wherein the at least one directory comprises information about memory locations where the data pages are stored.

16. The computer-readable storage medium device of claim 14, wherein the at least one directory comprises a higher-level directory and a lower-level directory, and wherein the higher-level directory comprises information about memory locations where lower-level directory pages are stored.

17. The computer-readable storage medium device of claim 14, wherein the dynamically modifying how many directory levels are provided for the indexing data structure comprises adding one or more directory levels to the indexing data structure when the number of data pages within the indexing data structure has increased such that a directory page corresponding to a lower-level directory is not sufficiently large to store the entire lower level directory.

* * * * *